United States Patent
Lonsdale et al.

(10) Patent No.: US 6,765,493 B2
(45) Date of Patent: Jul. 20, 2004

(54) APPARATUS AND METHOD FOR INTERROGATING A PASSIVE SENSOR

(75) Inventors: Anthony Lonsdale, Banbury (GB); Bryan Lonsdale, Banbury (GB)

(73) Assignee: Transense Technologies plc (GB)

( * ) Notice: Subject to any disclaimer, the term of this patent is extended or adjusted under 35 U.S.C. 154(b) by 0 days.

(21) Appl. No.: 10/083,278

(22) Filed: Feb. 25, 2002

(65) Prior Publication Data

US 2002/0121988 A1 Sep. 5, 2002

Related U.S. Application Data

(63) Continuation of application No. PCT/GB00/03382, filed on Sep. 4, 2000.

(30) Foreign Application Priority Data

Sep. 2, 1999 (GB) .............................................. 9920762

(51) Int. Cl.[7] .............................................. G08B 21/00
(52) U.S. Cl. ............................. 340/870.16; 340/870.17; 340/873.31; 340/505
(58) Field of Search .............................. 340/505, 539.1, 340/10.3, 10.42, 10.4, 870.16, 870.18, 870.28, 870.31; 73/24.06, 31.06, 49.3, 52; 600/300; 128/903

(56) References Cited

U.S. PATENT DOCUMENTS

| | | | |
|---|---|---|---|
| 4,321,539 A | * | 3/1982 | Trump ........................ 324/328 |
| 4,531,526 A | * | 7/1985 | Genest ........................ 600/300 |
| 4,646,066 A | | 2/1987 | Baughman et al. |
| 4,653,508 A | | 3/1987 | Cosman |
| 5,227,798 A | | 7/1993 | Hildebrand |
| 5,446,452 A | | 8/1995 | Litton |
| 5,604,486 A | * | 2/1997 | Lauro et al. ................ 340/10.3 |
| 5,668,303 A | * | 9/1997 | Giesler et al. ............. 73/24.06 |
| 5,942,991 A | * | 8/1999 | Gaudreau et al. ....... 340/870.16 |

* cited by examiner

Primary Examiner—Van Trieu
(74) Attorney, Agent, or Firm—Keusey, Tutunjian & Bitetto

(57) ABSTRACT

Apparatus for determining the resonant frequency of a passive sensor, for example a saw device, includes a device (5, 7, 3) for transmitting signals of a plurality of frequencies to the passive sensor (2); a device (3, 7) for receiving signals from the passive sensor simultaneously with the transmitting of signals; a device (7) for comparing the received signals with the transmitted signals to identify a characteristic change in the relationship between the received signals and the transmitted signals which occurs when the sensor is being driven at its resonant frequency. As the frequency at which the passive sensor is driven passes through the resonant frequency of the sensor the phase and/or amplitude of the signal generated by the passive sensor will change. By identifying this change of phase and/or amplitude the point at which resonance occurs can be detected. The frequency of the transmitted signal at the moment when the comparison indicates that the sensor is being driven at its resonant frequency is the resonant frequency of the sensor.

21 Claims, 1 Drawing Sheet

APPARATUS AND METHOD FOR INTERROGATING A PASSIVE SENSOR

CROSS REFERENCE TO RELATED APPLICATIONS

This is a Continuation of International Application PCT/GB00/03382, with an International filing date of Sep. 4, 2000, that designates the United States and claims priority from GB application 9920762.3 filed Sep. 2, 1999.

FIELD OF THE INVENTION

The present invention relates to an apparatus and method for interrogating a passive sensor and, particularly, but not exclusively, to an apparatus and method for interrogating a passive sensor incorporating a Surface Acoustic Wave (SAW) device.

DESCRIPTION OF RELATED ART

It is well known for Surface Acoustic Wave devices to be used for monitoring parameters such as temperature, pressure and strain. Such devices are comprised of a resonator made up of a micro-structure deposited on a piezoelectric substrate. The deposit is arranged to form at least one pair of interleaved comb like electrodes. Typically, the electrodes are made from aluminum (although other good conductors may be used) and have a thickness in the order of 100 Angstroms. The piezoelectric substrate is typically manufactured from ceramic or quartz material.

In use, the application of an electric pulse signal to one electrode of an electrode pair causes the associated SAW device to act as a transducer. The electric input signal is converted to an acoustic wave which is transmitted via the substrate to the other electrode of the electrode pair. On arrival of the acoustic wave at said other electrode, the transducing process is reversed and an electric output signal is generated. This output signal has a characteristic resonant frequency which is dependent upon a number of factors including the geometry of the micro-structure deposit (e. g. the spacing between the interleaved electrodes).

Since the spacing of the interleaved electrodes within an electrode pair varies as the substrate is deformed (e. g. by virtue of temperature variations or the application of a mechanical force), a change in the condition of a SAW device can be determined by monitoring the device resonant frequency. In this way, parameters such as temperature, pressure and strain which affect the condition of a SAW device may be measured. For example, if the temperature of a SAW device is reduced, then the piezoelectric substrate reduces in size and the interleaved electrodes move closer together. As a result, the resonant frequency of the SAW device increases. This increase can be measured and calibrated to provide an indication of the temperature change.

In prior art systems for interrogating a SAW device, an input signal in the form of an excitation pulse (typically having a period of 10 µs) is applied to one of the device electrodes by interrogation apparatus so as to initiate resonance.

Following termination of the excitation pulse, the output signal generated by the SAW device progresses through a transitional phase before stabilising for a short period of time at the resonance frequency. In the time taken for the output signal to stabilise, the interrogation apparatus switches from a signal transmitting mode to a signal receiving mode. The output signal from the SAW device may be then received by the interrogation apparatus and appropriately analysed so as to determine the output signal frequency. The frequency of the output signal is equal to the resonant frequency of the SAW device.

However, the need to allow the output signal from the SAW device to stabilise and the need to switch the interrogating apparatus between transmitting and receiving modes can unduly prolong an interrogation procedure, especially in circumstances where a large number of passive sensors are to be interrogated by the same interrogating apparatus. This is a perceived problem with the prior art systems.

SUMMARY OF THE INVENTION

It is an object of the present invention to provide an apparatus and method for determining the resonant frequency of a passive sensor in a convenient and rapid manner.

It is also an object of the present invention to provide an apparatus and method for interrogating two or more passive sensors functioning under different operating principles.

A first aspect of the present invention provides apparatus for determining the resonant frequency of a passive sensor, said apparatus comprising: means for transmitting signals of a plurality of frequencies to said passive sensor; means for receiving signals from said passive sensor simultaneously with said transmitting of signals; means for comparing the received signals with the transmitted signals to identify a characteristic change in the relationship between the received signal and the transmitted signal which occurs when the sensor is being driven at its resonant frequency; and means for determining the frequency of the transmitted signal at the moment when the comparison indicates that the sensor is being driven at its resonant frequency.

Thus, apparatus according to the present invention transmits a driving signal to a passive sensor such as a SAW device and at the same time receives the signal generated by the sensor in response to the driving signal. The return signal received by the interrogating apparatus is then compared with the transmitted signal. The transmitted signal and received signal will have a phase relationship determined at least in part by the mutual spacing of the transmitter, the received and the sensor. For any particular spacing, the phase relationship will depend on the phase relationship between the signal driving the sensor and the signal generated by the sensor in response to the driving signal. This phase relationship between the driving signal and the signal produced by the sensor in response to the driving signal will change at the resonant frequency of the sensor.

By comparing the received signal with the transmitted signal as the frequency of the transmitted signal varies but the distance between the transmitter, receiver and sensor remains substantially constant the phase change in the signal generated by the sensor in response to the driving signal can be detected. The frequency at which the transmitter is driving the sensor at the moment when resonance is detected will be the resonant frequency of the sensor and accordingly when resonance is detected as described above the resonant frequency can be obtained directly by identifying the frequency at which the transmitter is driving the sensor.

Preferably the driving signal is a radio frequency signal which is frequency modulated with a sweeping range of frequencies which span the expected resonant frequency of the sensor. Preferably the signals are transmitted across a gap between the transmitter and the sensor as radio signals by means of an antenna associated with the driving/comparing system and an antenna associated with the sensor. Preferably, a single antenna is used in the driving/comparing system for both transmitting the driving signal to the sensor and receiving the resultant signal from the sensor. Preferably the comparison of the transmitted and received signals is effective using a homodyne receiver.

A second aspect of the present invention provides a method for determining the resonant frequency of a passive sensor, said method comprising: transmitting signals of a plurality of frequencies to said passive sensor; receiving signals from said passive sensor simultaneously with said transmitting of signals; comparing the received signals with the transmitted signals to identify a characteristic change in the relationship between the received signal and the transmitted signal which occurs when the sensor is being driven about its resonant frequency; and determining the frequency of the transmitted signal at the moment when the comparison indicates that the sensor is being driven at its resonant frequency.

BRIEF DESCRIPTION OF THE DRAWINGS

An embodiment of the present invention will now be described with reference to the accompanying drawings, in which.

DETAILED DESCRIPTION OF PREFERRED EMBODIMENTS

Figure 1:
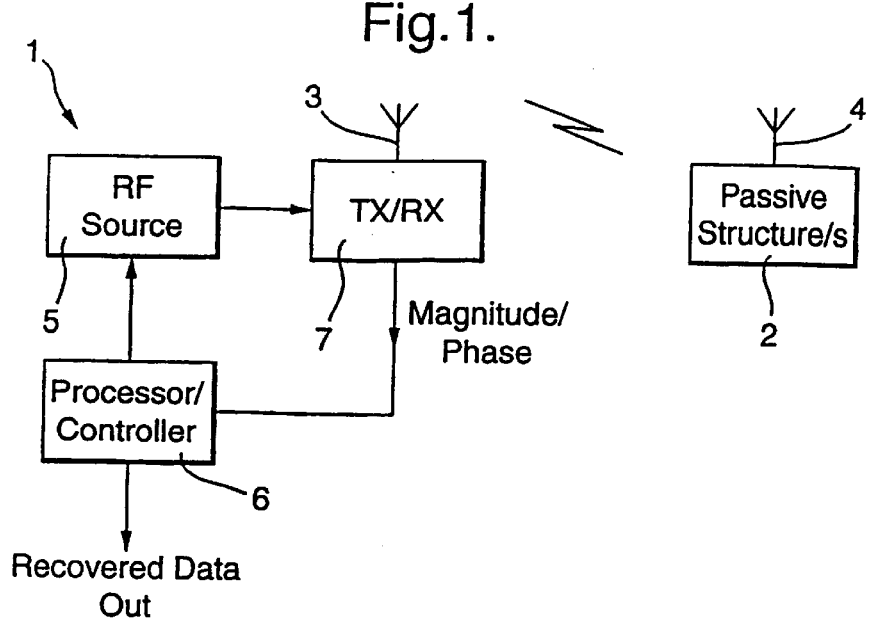
FIG. 1 is a block diagram of interrogation apparatus according to the present invention and an associated passive sensor.

The basic structure of an interrogation apparatus according to the present invention is shown as a block diagram in FIG. 1 of the accompanying drawings. This Figure shows the interrogation apparatus 1 communicating with a passive sensor 2 such as, a SAW device by means of radio frequency signals.

DETAILED DESCRIPTION OF PREFERRED EMBODIMENTS

Accordingly, both the interrogation apparatus and the passive sensor are provided with an appropriate antennae 3,4. Although only a single passive sensor 2 is illustrated in FIG. 1, interrogation apparatus according to the present invention may be used to interrogate a multiplicity of sensors which may or may not be of the same type. For example, high "Q" passive sensors (e.g. SAW devices) may be interrogated in conjunction with low "Q" passive sensors.

The interrogation apparatus shown in FIG. 1 incorporates an RF source 5 for generating radio frequency signals. The operating frequencies of the RF source may be in the Industrial Scientific Medical (ISM) frequency ranges (i.e. 868 MHz or 2.45 GHz) or otherwise, as appropriate. The nature of the RF signals generated by the RF source 5 is determined by an appropriate processor/controller 6.

The radio frequency signals generated by the RF source 5 upon instruction from the processor/controller 6 are transmitted to the passive sensor 2 to be interrogated via transmit/receive ("TX/RX") circuitry 7 capable of transmitting and receiving radio frequency signals simultaneously.

Figure 2:
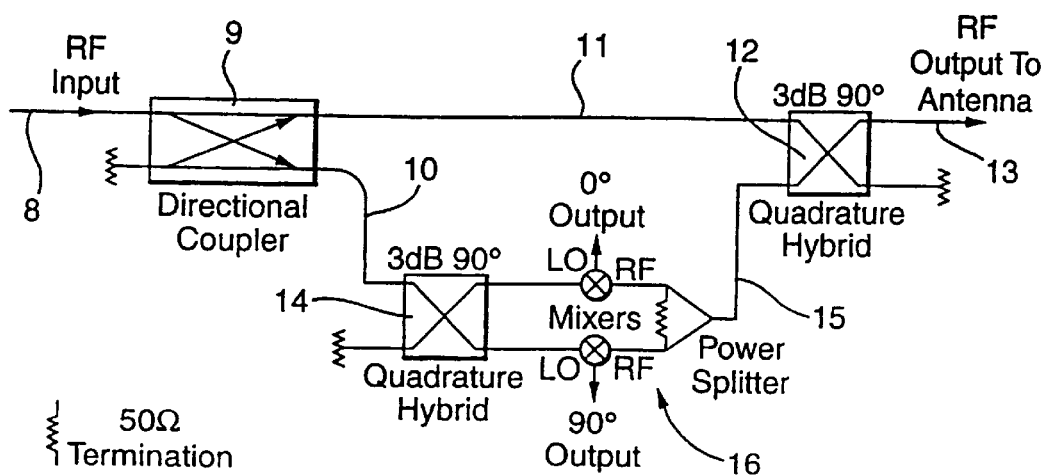
FIG. 2 is a schematic circuit diagram of means for transmitting and receiving a signal.

The TX/RX circuitry 7 provided in the interrogation apparatus of FIG. 1 is shown schematically in FIG. 2 of the accompanying drawings. The TX/RX circuitry 7 shown in FIG. 2 receives an RF input 8 from the RF source 5.

The input is applied to a directional coupler 9 which passes most of the RF signal to an output 11 and a small proportion of the RF signal to an output 10. The bulk signal on output 11 passes through a quadrature hybrid device 12 to provide a drive signal to the antenna 3 via an output 13.

The RF signal on coupler output 10 passes through a quadrature hybrid 14 to provide an input reference signal to a homodyne detector 16. The other input to the homodyne detector is derived via a line 15 from the quadrature hybrid 12. The quadrature hybrid 12 directs the received signal from the antenna to the power splitter input of the homodyne detector. For further information on the operation of the homodyne detector attention is directed to the paper entitled "Measuring microwave field directly with an optically modulated scatterer" by G. Hygate and J. F. Nye published in Measurement Science and Technology 1990 at pages 703–709.

The radio frequency signal generated by the passive sensor 2 in response to the driving signal generated by the RF source 5 is, once received by the interrogation apparatus, combined by the TX/RX circuitry 7 with the originally transmitted radio frequency output signal. Typically, a comparison of the phases and/or amplitudes of the output (i.e. transmitted) and input (i.e. received) signals is effected. The combined signal generated by the TX/RX circuitry 7 is provided as input to the processor/controller 6 which determines whether or not the passive sensor is being driven at its resonant frequency.

In use, the RF source 5 produces a driving signal having a sequential range of frequencies which spans the likely resonant frequency of the sensor to be interrogated. The range of frequencies can be produced as a discrete set of frequency pulses of different frequencies or as a continuously changing frequency.

Preferably, the RF source 5 produces an RF signal which is frequency modulated to provide a substantially continuous range of driving frequencies which spans the likely resonant frequency of the sensor.

When the sensor 2 is being driven at a frequency less than its resonant frequency the signal which it generates in response to the driving signal will typically phase lag the driving signal. When the sensor is being driven at a frequency which is greater than its resonant frequency the signal which it generates in response to the driving signal will typically phase lead the driving signal. At the point of resonance the driving signal and the resultant signal will typically be either in phase or 180° out of phase. By monitoring the phase relationship between the received signal and the transmitted signal as the transmitted signal sweeps through the resonant frequency the phase change which occurs at resonance can be detected at the TX/RX circuitry 7. Alternatively, the amplitude of the signal received at the TX/RX circuitry from the sensor 2 may be compared with the amplitude of the transmitted driving signal. At the point of resonance the amplitude of the received signal will decrease and this may be detected from the comparison of the amplitude of the received and transmitted signals. The processor/controller may then determine the resonant frequency by reference to the frequency of the output signal and, in accordance with calibration data for the particular passive sensor under interrogation, provide an appropriate parameter (e. g. temperature) measurement.

The present invention is not limited to the specific embodiment or method described above. Alternative arrangements and suitable materials will be apparent to a reader skilled in the art.

What is claimed is:

1. An apparatus for determining the resonant frequency of a passive sensor, said apparatus comprising: means for transmitting signals of a plurality of frequencies to said passive sensor; means for receiving signals from said passive sensor simultaneously with said transmitting of signals; means for comparing the received signals with the transmitted signals to identify a characteristic change in the relationship between the received signals and the transmitted signals which occurs when the sensor is being driven at its resonant frequency; and means for determining the frequency of the transmitted signal at the moment when the comparison indicates that the sensor is being driven at its resonant frequency.

2. The apparatus according to claim 1 wherein the sensor is driven by a driving signal that is a radio frequency signal which is frequency modulated with a sweeping range of frequencies which span an expected resonant frequency of the sensor.

3. The apparatus according to claim 1 wherein the sensor is driven by a driving signal that is a radio frequency signal which comprises pulses having a sequential range of separate frequencies which spans the expected resonant frequency of the sensor.

4. The apparatus according to claim 1 wherein the signals are transmitted across a gap between the means for transmitting and the sensor as radio signals by an antenna associated with the means for transmitting and means for comparing and an antenna associated with the sensor.

5. The apparatus according to claim 1 wherein a single antenna is used in means for transmitting and means for comparing for both transmitting the driving signal to the sensor and receiving the resultant signal from the sensor.

6. The apparatus according to claim 1 wherein the comparison of the transmitted and received signals is a phase comparison.

7. The apparatus according to claim 1 wherein the comparison of the transmitted and received signals is an amplitude comparison.

8. The apparatus according to claim 1 wherein the comparison of the transmitted and received signals is affected using a homodyne receiver.

9. The apparatus according to claim 1 wherein the sensor is a Surface Acoustic Wave (SAW) device.

10. The apparatus according to claim 1 wherein the transmitter means includes and antenna for transmitting radio signals to the passive device such that when in use, the passive device is located beyond a near magnetic field associated with the transmitter means.

11. A method for determining the resonant frequency of a passive sensor, said method comprising the steps of: transmitting signals of a plurality of frequencies to said passive sensor; receiving signals from said passive sensor simultaneously with said transmitting of signals; comparing the received signals with the transmitted signals to identify a characteristic change in the relationship between the received signal and the transmitted signal which occurs when the sensor is being driven at its resonant frequency; and determining the frequency of the transmitted signal at the moment when the comparison indicates that the sensor is being driven at its resonant frequency.

12. The method according to claim 11 wherein the step of transmitting signals of a plurality of frequencies to said passive sensor includes transmitting radio signals to the passive device via antenna wherein the passive device is located beyond a near magnetic field associated with a transmitter, when in use.

13. An apparatus for determining a resonant frequency of a passive sensor, comprising:
   a transmitter/receiver which transmits signals of a plurality of frequencies to be received by a passive sensor, and which receives signals from the passive sensor simultaneously with transmitted signals sent by the transmitter; and
   a comparing device which compares signals received from the sensor and the transmitter/receiver to identify a characteristic change in a relationship between the received sensor signals and the transmitted signals which occurs when the sensor is being driven at its resonant frequency to determine the frequency of the transmitted signal when the comparison indicates that the sensor is being driven at its resonant frequency.

14. The apparatus according to claim 13 wherein the sensor is driven by a driving signal that is a radio frequency signal which is frequency modulated with a sweeping range of frequencies which span an expected resonant frequency of the sensor.

15. The apparatus according to claim 13 wherein the sensor is driven by a driving signal that is a radio frequency signal which comprises pulses having a sequential range of separate frequencies which span the expected resonant frequency of the sensor.

16. The apparatus according to claim 13 wherein the signals are transmitted across a gap between the transmitter/receiver and the sensor as radio signals by an antenna associated with the transmitter/receiver and an antenna associated with the sensor.

17. The apparatus according to claim 13 wherein the comparing device compares the transmitted and received signals as a phase comparison.

18. The apparatus according to claim 13 wherein the comparing device compares the transmitted and received signals as an amplitude comparison.

19. The apparatus according to claim 13 wherein the comparison of the transmitted and received signals is affected using a homodyne receiver.

20. The apparatus according to claim 13 wherein the sensor is a Surface Acoustic Wave (SAW) device.

21. The apparatus according to claim 13 wherein the transmitter/receiver includes and antenna for transmitting radio signals to the passive device such that when in use, the passive device is located beyond a near magnetic field associated with the transmitter/receiver.

\* \* \* \* \*